Dec. 22, 1970     C. D. DOCKERY     3,548,459
SHEARING RING FOR SPLIT MOLD THERMOFORMING
Filed Nov. 8, 1968     2 Sheets-Sheet 1
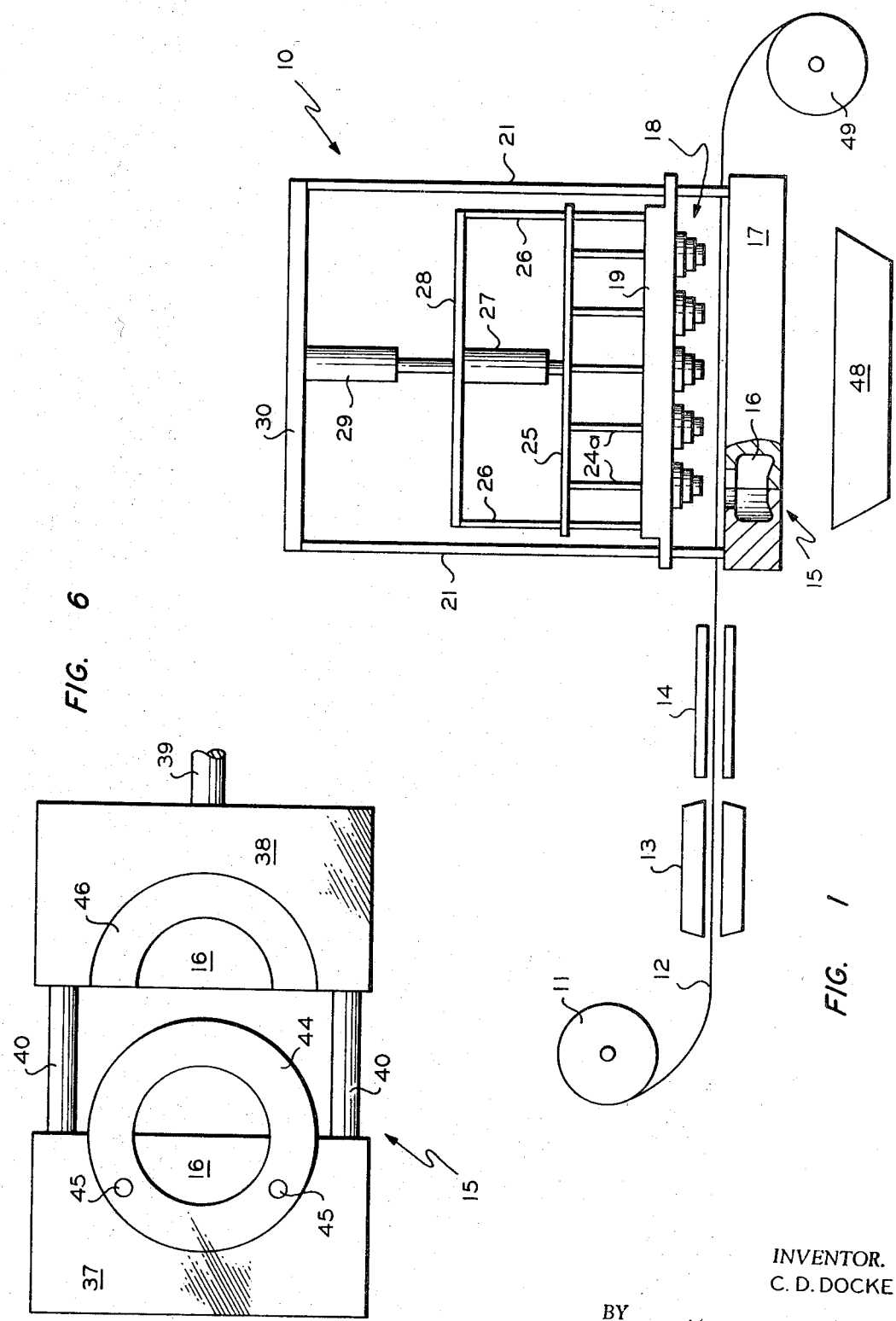
INVENTOR.
C. D. DOCKERY
BY
*Young and Quigg*
ATTORNEYS

INVENTOR.
C. D. DOCKERY
BY
ATTORNEYS

United States Patent Office 3,548,459
Patented Dec. 22, 1970

3,548,459
SHEARING RING FOR SPLIT MOLD
THERMOFORMING
Calvin D. Dockery, Bartlesville, Okla., assignor to Phillips Petroleum Company, a corporation of Delaware
Filed Nov. 8, 1968, Ser. No. 774,247
Int. Cl. B29c 3/00, 17/00
U.S. Cl. 18—19                              6 Claims

ABSTRACT OF THE DISCLOSURE

An apparatus for separating a thermoformed container and the sheet from which it was forced. The apparatus includes a movable mandrel providing a first shearing edge and a ring die providing a second shearing edge. The ring die is integrally formed and is mounted on one of two relatively movable mold halves. As the mandrel moves into the die, the shearing edges pass in close conformity thereby separating the container from the sheet.

BACKGROUND AND SUMMARY OF THE INVENTION

The present invention relates to thermoforming of containers. In one aspect, it relates to an improved technique and apparatus for separating the formed container and the material from which it was formed.

Conventionally, the thermoforming process for shaping plastics includes the sequential steps of heating a thermoplastic sheet to its softening temperature, expanding the sheet to conform to the contour of the mold, and separating the formed container from the sheet material.

The present invention is concerned with the separation of the shaped container from the thermoplastic sheet, particularly in connection with the technique employing split molds. Heretofore, the split mold had been provided with complementary shaped split dies which in the closed position define an interior ring. The ring provided an annular shearing edge which was aligned with a complementary shaped shearing edge on a block die mounted on a movable mandrel. The shearing of the sheet was affected by moving the block die into the ring die, the complementary shaped shearing edges passing in close conformity to cut the sheet. This arrangement proved satisfactory for techniques which required relatively small amounts of force to shear the plastic sheet. However, in some applications the force required to shear the sheet is extremely high. For example, where the temperature of the thermoplastic sheet is maintained at or near the lower limits of the softening temperature range, the material exhibits minimum pliability and presents increased resistance to shear. Furthermore, if the technique involves the use of thick sheets, as is required in thermoforming large containers, the shearing force must be increased accodingly. In order to obtain a clean cut the clearance between the cooperating shear edges must be in the tolerance range of 0.001 inch. Since the complementary split dies must be arranged in abutting relation, the cutting edge is discontinuous and therefore produces a container having imperfections along the parting line. These imperfections must be removed to place the neck in a condition for receiving a threaded or snap-on cap.

The high forces required to shear the plastic sheet tends to separate the mold halves. Use of the complementary shaped dies requires that the mold apparatus be provided with means such as hydraulic cylinders to oppose the separation forces created by the shearing action. Where high shearing forces are encountered, it is economically unfeasible to provide the apparatus with sufficient back-up force to prevent any separation of the split dies.

Thus, use of the prior art devices has proven unsatisfactory for particular applications of the thermoforming process. The prior art devices produced containers having an excessive amount of flash along the parting lines because of the imperfections in the die ring and/or because of insufficient back-up force provided by the apparatus.

The purpose of the present invention is to provide a thermoforming apparatus with a cutting mechanism having a near perfect shearing edge and one which eliminates the tendency of the split molds to separate.

The invention contemplates the use of an integrally formed ring die mounted on one of the mold halves. While the die may be mounted on either mold half, it is described in this preferred embodiment as being on the stationary half. As the movable half is moved into engagement with the stationary half, the inner annular shearing edge of the ring die registers with the mold cavity defined therebelow. At the proper time in the process cycle, a mandrel carrying a block die having a shearing edge conforming closely to that of the ring die is actuated. The former moves internally of the latter and the respective shearing edges passing in close conformity shear the sheet disposed therebetween. The use of the integral (one-piece) ring die permits the interior shearing edge to be accurately and continuously machined within the tolerance specifications. Furthermore, since the force of the movable die acts on a one-piece member, e.g., the integral ring die, there is no separation force tending to move the mold halves apart. It should be observed that the term "ring die" issued merely to distinguish it from its correlated part, the block die, and that both dies may take the form of any desired geometric configuration.

Briefly, then, the objects of this invention are to provide an improved apparatus for separating a container from its associated thermoplastic sheet; to provide a molding apparatus with a ring die which may be machined within the tolerance requirements of the technique employed; and, to provide a molding apparatus with a ring die which functions to eliminate the separation forces created by the shearing action.

DRAWINGS

FIG. 1 is a diagrammatic presentation illustrating the molding apparatus in which the cutting mechanism of this invention may be used;

Figure 3:
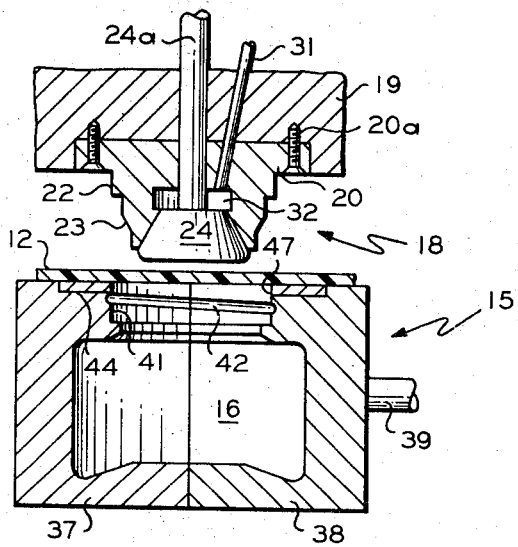
FIG. 3 is a view similar to FIG. 2 showing the molding apparatus in the closed position.
Figure 4:
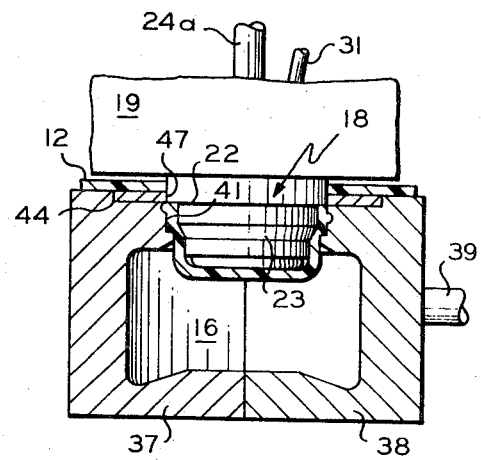
Figure 5:
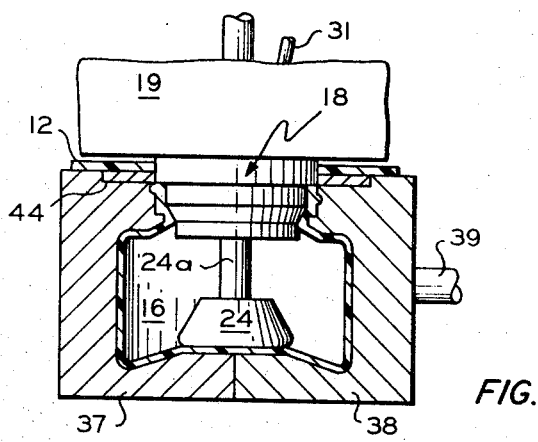
Figure 2:
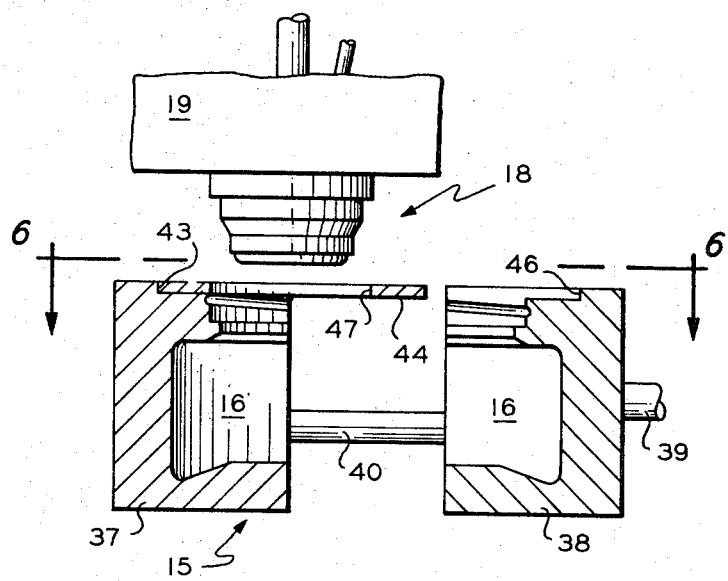
FIG. 2 is an enlarged fragmentary, sectional view showing the molding and cutting apparatus of this invention.

FIGS. 4 and 5 are views similar to FIGS. 2 and 3 showing subsequent, sequential stages in the thermoforming operation; and FIG. 6 is a plan view of the molding and cutting apparatus and as viewed from a plane indicated by the line 6—6 of FIG. 2.

DESCRIPTION OF THE PREFERRED EMBODIMENT

The cutting mechanism of this invention will be described in connection with a thermoforming apparatus of the type shown in FIG. 1. However, it should be emphasized that this is by way of illustration only and should not be construed as limiting. Referring to FIG. 1, a thermoforming apparatus, shown generally as 10, is seen to include a roll 11 which feeds a sheet 12 of the thermoplastic material, such as polypropylene, successively through a radiant heater 13 and a uniform temperature block 14. The hot plastic sheet 12 is then passed over a bank of molds (one shown as 15 defining cavity 16) supported by frame 17. A plurality of mandrels 18 longitudinally spaced along platen 19 are vertically spaced above the molds 16 in such a way that each mandrel is aligned with a corresponding mold. The platen 19 is slidably mounted on a pair of spaced vertical guide rods 21 so that each of the mandrels 18 are movable by means described below into and out of its corresponding mold cavity 16.

Referring to FIG. 3, each mandrel 18 includes a flanged portion 20 which fits in a suitable recess formed in the platen 19 and is held in place by a plurality of flat head bolts 20a. The mandrel 18 is configured to provide an axially extending and annularly shaped shear edge 22.

Projecting outwardly from the shear edge 22 and integrally formed therewith is a portion 23 having a particular external shape for forming the neck of the container. Portion 23 is beveled for receiving a plunger 24 which includes a stem 24a. The stem 24a extends through a suitable opening provided in the platen 19 and has its upper end attached to a cross bar 25 (see FIG. 1). The cross bar 25, slidably mounted on upright rods 26, 26 is movable therealong by a hydraulic cylinder 27. Cylinder 27 is anchored to another cross bar 28 so that extension of the cylinder piston rod moves the cross bar 25 and plungers 18 downwardly. The entire assembly, including the platen 19, the plungers 24 and their associated moving mechanisms, are movable as a unit by means of another hydraulic cylinder 29. The piston rod and head end of cylinder 29 are connected to the cross bar 28 and another cross bar 30, respectively, so that actuation of the cylinder 29 moves the assembly disposed therebelow downwardly as a unit.

A blow pipe 31 extends through the platen 19 and a portion of the mandrel 18 and communicates with an internal space 32 separating the mandrel 18 and the plunger 24.

As best seen in FIGS. 2 and 6, the mold 15 includes complementary mold halves 37 and 38. The mold half 38 is slidably mounted on guide rods 40, 40 and movable toward and away from the mold half 37, which is fixed to the frame 17. A piston rod 39 of a conventional cylinder provides the means for moving the half 38 from the open position shown in FIG. 2 to the closed position shown in FIG. 3. In the closed position, the complementary shaped mold halves 37 and 38 define the cavity 16 having the general configuration of the container to be molded. A neck portion 41 is provided with a spiral groove 42 for the formation of threads.

Returning to FIGS. 2 and 6, a semicircular recess 43 formed in the upper surface of mold half 37 receives a portion of a ring die 44. The ring die 44 is secured to the mold half 37 by flat head bolts 45, and with the mold halves 37 and 38 in the open position presents a portion protruding outwardly toward half 38. Formed in mold half 38 is a semicircular recess 46 complementary shaped to snugly receive the protruding half of ring die 44. An inner, annular, axially extending surface 47 of the ring die 44 constitutes a shearing edge which cooperates with the shearing edge 22 of the mandrel 18. With the mold halves 37 and 38 in the closed position (FIG. 3) the circular opening defined by surface 47 registers with the neck portion 41 of cavity 16. Thus, as the mandrel 18 is moved downwardly into the cavity 16, the shearing edge 22 passes in close conformity with the shearing edge 47 of the ring die. The use of the integral, one-piece ring die permits the machining of the two cooperating surfaces to attain the conformity required for the application contemplated by this invention. The prior art devices using split complementary shaped die sections could not attain the necessary conformity because of the inherent imperfection of the inner annular surface of the sections.

The operation of this apparatus will be described with reference to the sequential drawings, FIGS. 3, 4, 5 and 6. The thermoplastic material 12 is passed over the die cavity 16 and held in place for the expansion stage of the thermoforming process. Initially, the platen 19 carrying the mandrels 18 is moved downwardly by the action of hydraulic cylinder 29 (see FIG. 1). This places each mandrel 18 in the position shown in FIG. 4. In moving from the position shown in FIG. 3 to that in FIG. 4, the shearing edge 22 of the mandrel 18 passes shearing edge 47 of the ring die 44 thus cutting a disc from sheet 12, the edge of said disc being forced into groove 42 to form the threads. Note that the shearing force is between the cooperating edges so that the one-piece ring precludes the development of a separation force as would occur with the split, complementary shaped die rings. Now with the mandrel 18 positioned as shown in FIG. 4 and with the container neck shaped in the annular zone between the mandrel portion 23 and the neck portion 41, hydraulic cylinder 27 is actuated forcing the stems 24a downwardly pushing the plunger 24 to the bottom of the cavity 16 (see FIG. 5). At this stage in the operation air is introduced through the tube 31 expanding the thermoplastic material outwardly into conformance with the contour of the mold cavity 16. After the thermoplastic material has cooled to its set temperature, the plunger 24 is withdrawn and the mold halves 37 and 38 separated ejecting the container into a bin 48 underlying the frame 17 (see FIG. 1). The ejection may be facilitated by conventional means such as an air tube or a pusher. Note that container is ejected downwardly so that the ring die 44 does not hamper ejection. A take up roller 49 then moves the sheet 12 to the next index position.

Thus, it has been demonstrated that the present invention provides for an improved conformity between the cooperating shearing edges and eliminates the tendency of the mold halves to separate.

What is claimed is:

1. In a thermoforming apparatus having a pair of mold halves which are movable to a closed position defining an internal cavity in the shape of a container, a mandrel providing a shearing edge, and means for positioning thermoplastic material between said mold halves and said mandrel, the improvement comprising an integral die mounted on one of said mold halves, said die having a portion conforming substantially to the configuration of said mandrel shearing edge thereby providing a second shearing edge cooperative with said mandrel shearing edge to cut said thermoplastic material as said mandrel and said die are moved past one another.

2. The invention as recited in claim 1 wherein said second shearing edge is provided on an internal circumferentially continuous and axially extending surface formed in said die portion, said mandrel shearing edge adapted to pass internally of said axially extending surface to shear said thermoplastic material.

3. The invention as recited in claim 2 wherein one of said mold halves is stationary and the other of said halves is movable between a closed and open position in relation to said stationary half, said die being mounted on said stationary half and registerable with said movable half in said closed position wherein said continuous axially extending surface defines an opening aligned wtih said cavity.

4. A cutting mechanism for use in a thermoforming machine of the type having a pair of relatively movable mold halves which, when in closed position, define a cavity substantially in the shape of a container having a body portion and a neck portion, and means for positioning thermoplastic sheet material over said mold halves, said cutting mechanism comprising: a mandrel having a shearing edge; a die mounted on one of said mold halves and having a continuous, axially extending surface defining an internal opening in said die, said opening being registerable with said neck portion with said mold halves in the closed position, said surface providing a shearing edge substantially circumscribing said neck portion; and means for moving said mandrel axially into said opening, said mandrel shearing edge passing in close conformity with said die shearing edge to cut said thermoplastic sheet material.

5. The invention as recited in claim 4 wherein one of said mold halves is stationary and the other of said halves is movable, said die being secured to said stationary half.

6. The invention as recited in claim 4 wherein said mandrel is movable from a withdrawn position to an inserted position in said neck portion of said mold halves, said mandrel including a shaping portion which in combination with said neck portion defines an annular zone, said mandrel being movable in a stroke to said inserted position, said mandrel shearing edge operative with said die shearing edge to cut said thermoplastic sheet material, and said shaping zone operative to compress said material in said shaping zone in one stroke of said material.

References Cited

UNITED STATES PATENTS

| | | | |
|---|---|---|---|
| 2,270,187 | 1/1942 | Dulmage | 18—19 |
| 3,173,174 | 3/1965 | Edwards | 18—19 |
| 3,218,379 | 11/1965 | Edwards. | |
| 3,235,639 | 2/1966 | Knowles. | |
| 3,461,503 | 8/1969 | Dockery | 18—19 |

J. SPENCER OVERHOLSER, Primary Examiner

R. L. SPICER, JR., Assistant Examiner

U.S. Cl. X.R.

18—42

UNITED STATES PATENT OFFICE

CERTIFICATE OF CORRECTION

Patent No. 3,548,459        C. D. Dockery        Dated Dec. 22

It is certified that error appears in the above-identified patent and that sa Letters Patent are hereby corrected as shown below:

Column 5, line 11, "mendrel" should read -- mandrel --;

Column 5, line 15, "material" should read -- mandrel --.

Signed and sealed this 20th day of April 1971.

(SEAL)
Attest:

EDWARD M. FLETCHER, JR.        WILLIAM E. SCHUYLER, JR.
Attesting Officer        Commissioner of Patents